United States Patent [19]

König et al.

[11] Patent Number: 6,066,700
[45] Date of Patent: May 23, 2000

[54] PROCESS FOR THE PRODUCTION OF POLYSILOXANE/POLYCARBONATE BLOCK CO-CONDENSATION PRODUCTS

[75] Inventors: Annett König; Wolfgang Ebert, both of krefeld; Walter Köhler, Duisburg, all of Germany

[73] Assignee: Bayer Aktiengesellschaft, Leverkusen, Germany

[21] Appl. No.: 09/350,337

[22] Filed: Jul. 9, 1999

Related U.S. Application Data

[63] Continuation-in-part of application No. 09/033,130, Mar. 2, 1998, abandoned.

[30] Foreign Application Priority Data

Mar. 12, 1997 [DE] Germany ............................ 197 10 081

[51] Int. Cl.[7] .................................................. C08F 283/02
[52] U.S. Cl. .............................. 525/464; 528/26; 528/13; 528/23
[58] Field of Search .................................. 528/26, 23, 13; 525/464

[56] References Cited

U.S. PATENT DOCUMENTS

| | | | |
|---|---|---|---|
| 4,920,183 | 4/1990 | Evans et al. | 525/464 |
| 5,227,449 | 7/1993 | Odell et al. | 525/26 |
| 5,344,908 | 9/1994 | Rosenquist | 528/29 |
| 5,504,177 | 4/1996 | King, Jr. et al. | 528/29 |
| 5,783,651 | 7/1998 | Konig et al. | 528/21 |

FOREIGN PATENT DOCUMENTS 195 39 290   4/1997   Germany.

*Primary Examiner*—David W. Wu
*Assistant Examiner*—Caixia Lu-Rutt
*Attorney, Agent, or Firm*—Joseph C. Gil; Aron Preis

[57] ABSTRACT

A process for the production of polysiloxane/polycarbonate block cocondensation products is disclosed. The process comprises reacting in the melt at temperatures of 250 to 320° C. and pressures of 0.01 to 100 mbar (a) a hydroxyaryloxy-terminated dimethylsiloxane with (b) an oligocarbonate. The oligocarbonate is characterized in that its weight average molecular weight is 3000 to 24000 and the molar ratio of its OH end groups to aryl end groups is 10:90 to 70:30. The weight ratio of said (a) to said (b) in the inventive process is between 1:99 and 40:60. Also disclosed are the products prepared by the process.

8 Claims, No Drawings

PROCESS FOR THE PRODUCTION OF POLYSILOXANE/POLYCARBONATE BLOCK CO-CONDENSATION PRODUCTS

This application is a Continuation-In-Part of U.S. Ser. No. 09/033,130, filed Mar. 2, 1998, now abandoned.

BACKGROUND OF THE INVENTION

The present invention provides a process for the production of polysiloxane/polycarbonate block co-condensation products from phenolic compounds and diaryl carbonates in a melt at temperatures of 250° C. to 320° C., preferably of 280° C. to 300° C., and pressures of 0.01 mbar to 100 mbar, optionally in the presence of a catalyst, which process is characterized in that the phenolic compounds used are hydroxyaryloxy-terminated dimethylsiloxanes and, instead of diaryl carbonates, oligocarbonates are used prepared from diphenols having average molecular weights Mw (weight average, determined by measuring relative solution viscosity in $CH_2Cl_2$ in the known manner, wherein calibration is performed using the light scattering method) of 3000 to 24000, preferably of 5000 to 15000, and having OH/aryl end group ratios of 10:90 to 70:30, preferably of 20:80 to 60:40, wherein the weight ratio between the hydroxyaryloxy-terminated dimethylsiloxanes to the oligocarbonates is between 1:99 and 40:60, preferably between 3:97 and 30:70.

The oligocarbonates to be used according to the invention may be introduced as such or formed in situ before the reaction according to the invention.

The polysiloxane/polycarbonate block co-condensation products obtainable according to the invention, in particular, exhibit an improved low temperature impact strength, improved ESC behavior and improved flow characteristics.

The present invention accordingly also provides the polysiloxane/-polycarbonate block co-condensation products obtainable using the process according to the invention.

The preparation of polysiloxanecarbonate block copolymers using the phase interface process is known from the literature and described, for example, in U.S. Pat. No. 3,189,662, U.S. Pat. No. 3,419,634, DE-OS 3 34 782 (LeA 22,594) and EP 0 122 535 (Le A 22,594-EP).

U.S. Pat. No. 5,227,449 describes the preparation of polysiloxane-carbonate block copolymers using the melt transesterification process from bisphenol, diaryl carbonate, silanol-end-terminated polysiloxanes and catalyst. The siloxane compounds used in this process are polydiphenyl- or polydimethylsiloxane telomers having silanol end groups. It is, however, known that such dimethylsiloxanes having silanol end groups, unlike diphenylsiloxane having silanol end groups, have an increasing tendency to undergo self-condensation as chain length decreases, so rendering incorporation into the resultant copolymer more difficult. The cyclic siloxanes formed in this manner remain in the polymer and are extremely disruptive in applications in the electrical/electronics sectors.

U.S. Pat. No. 5,504,177 describes the production of a block copolysiloxanecarbonate by melt transesterification from a carbonate-terminated silicone with bisphenol and diaryl carbonate. Due to the elevated incompatibility of the siloxanes with bisphenol and diaryl carbonate, it is not possible to achieve uniform incorporation of the siloxanes into the polycarbonate matrix using the melt transesterification process, such that these products exhibit delamination. A further disadvantage is the elaborate two-stage process for preparation of the siloxane blocks.

U.S. Pat. No. 4,920,183 describes the production of siloxane/-poly(aryl carbonate) block copolymers by reacting a hydroxyl-terminated poly(aryl carbonate) oligomer with a chlorine-terminated polydiorgano-siloxane in an organic solvent in the presence of an acid scavenger.

U.S. Pat. No. 5,344,908 describes the preparation of a silicone/polycarbonate block copolymer by means of a two-stage process in which an OH-terminated BPA oligocarbonate produced by a melt transesterification process is reacted with a chlorine-terminated polyorganosiloxane in the presence of an organic solvent and an acid scavenger.

A disadvantage of the latter two processes is the use of organic solvents in at least one stage of synthesis of the silicone/polycarbonate block copolymers.

The object was accordingly to provide a process by means of which polysiloxane/polycarbonate block copolymers are obtainable by a melt transesterification process, i.e., without using organic solvents, wherein, for the purposes of the mechanical properties, the siloxane blocks should be largely uniformly distributed within the PC matrix.

Prior German Patent Application P 195 39 290.6 (Le A 31,263) filed Oct. 23, 1995, also describes a process for the production of poly(diorgano-siloxane)/polycarbonate block copolymers in a melt from Si-free diphenols, carbonic acid diaryl esters and polydiorganosiloxanes, wherein special catalysts must be used.

It is stated on page 9, lines 12–13 of that application that, instead of the Si-free diphenols, it is also possible to react oligocarbonates containing OH groups prepared from these diphenols.

This prior patent application gives no further details relating to the oligocarbonates.

Hydroxyaryloxy-terminated dimethylsiloxanes are well known. The preferred hydroxyaryloxy-terminated dimethylsiloxanes are those of the formula (I)

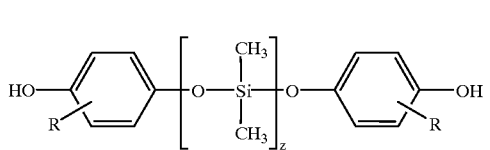

in which

R is H, Cl, Br, or $C_1$–$C_4$ alkyl, preferably H or $CH_3$, z is a number from 5 to 150, preferably from 7 to 80 and in particular from 10 to 60.

Production of the dimethylsiloxanes (I) is described, for example, in DE 3 334 782 A1.

The production of other, hydroxyaryloxy-terminated dimethyl-siloxanes to be used according to the invention proceeds in the same manner.

It is preferred that the dimethylsiloxanes will be used in the purest possible form, i.e., that they contain virtually no alkali metal compounds nor alkaline earth metal compounds.

Oligocarbonates prepared from diphenols are known. The preferred oligocarbonates are those of the formula

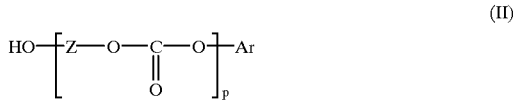

in which z is an arylene residue having 6 to 30 C atoms, which may be mono- or polycyclic, may contain heteroatoms and may be substituted by halogen, for example Cl, Br, or by $C_1$–$C_3$ alkyl groups, Ar is a $C_6$–$C_{14}$ aryl group, preferably phenyl, halophenyl or alkylphenyl, and p is 5 to 300, preferably 10 to 150 and in which the ratio of OH to Ar is between 10:90 and 70:30.

The oligocarbonates of formula (II) may be produced by reacting dihydroxy aromatic compounds of the formula (III)

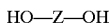
$$HO-Z-OH \tag{III}$$

with diaryl carbonates (IV)

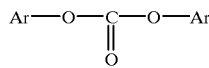
$$Ar-O-\underset{\underset{O}{\|}}{C}-O-Ar \tag{IV}$$

in a known manner according to DE-OS 42 38 123 (Le A 29,275), or the corresponding Belgian Patent 09 30 1216 or the corresponding U.S. Pat. No. 5,340,905.

The oligocarbonates (II) are thus produced, for example, by transesterifying the aromatic dihydroxy compounds (III) with the diaryl carbonates (IV) at temperatures of between 100° C. and 290° C., preferably of between 150° C. and 280° C. in the presence of catalysts, wherein the liberated monophenols are removed by applying a vacuum of between 1 bar and 0.5 mbar, preferably of between 500 mbar and 1 mbar.

The resultant oligocarbonates are isolated in a known manner.

Other aromatic oligocarbonates to be used according to the invention are produced in a similar manner.

Suitable aromatic dihydroxy compounds (III), in which Z has the meaning stated for (II), are hydroquinone, resorcinol, bis-(hydroxyphenyl)-alkanes, bis-(hydroxyphenyl) cycloalkanes, bis-(hydroxyphenyl) sulphides, ethers, sulphoxides, sulphones and α,α-bis-(hyroxyphenyl) diisopropyl-benzenes together with the ring-alkylated and ring-halogenated compounds thereof.

Preferred aromatic dihydroxy compounds (III) are: 4,4'-dihydroxydiphenyl, 2,2-bis-(hydroxyphenyl)propane, 2,4-bis-(hydroxyphenyl)-2-methylbutane, 1,1-bis(hydroxyphenyl)cyclohexane, α,α-bis(hydroxyphenyl)p-diisopropylbenzene, α,α-bis(hydroxy-phenyl)m-diisopropylbenzene, 2,2-bis-(3-methyl-4-hydroxyphenyl)-propane, 2,2-bis-(3-chloro-4-hydroxyphenyl)propane, bis-(3,5-dimethyl-4-hydroxy-phenyl)methane, bis-(3,5-dimethyl-4-hydroxyphenyl) sulphone, 2,4-bis-(3,5-dimethyl-4-hydroxyphenyl)-2-methylbutane, 1,1-bis-(3,5-dimethyl-4-hydroxyphenyl)cyclohexane, α,α(-bis-(3,5-dimethyl-4-hydroxyphenyl)-p-diisopropylbenzene, 1,1-bis-(4-hydroxyphenyl)-3,3,5-trimethylcyclohexane, 1,1-bis-(4-hydroxyphenyl)-3-methylcyclohexane, 1,1-bis-(4-hydroxyphenyl)-3,3-dimethylcyclohexane, 1,1-bis-(4-hydroxyphenyl)-4-methylcyclohexane, 2,2-bis-(3,5-dichloro-4-hydroxyphenyl)propane, 2,2-bis-(3,5-dibromo-4-hydroxyphenyl)propane, 1,1-bis-(4-hydroxyphenyl)-1-phenylethane, 2,2-bis-(3,5-dimethyl-4-hydroxyphenyl)-2-phenylethane, 2,2-bis-(4-hydroxyphenyl)-2,2-diphenylethane, 9,9-bis-(4-hydroxyphenyl)-fluorene.

Particularly preferred aromatic dihydroxy compounds (III) are, for example: 2,2-bis-(4-hydroxyphenyl)propane, 2,2-bis-(3,5-dimethyl-4-hydroxyphenyl)propane, 1,1-bis-(4-hydroxyphenyl)cyclohexane, 1,1-bis-(4-hydroxyphenyl)-1-phenylethane, 1,1-bis-(4-hydroxyphenyl)-3,3,5-trimethylcyclohexane, 1,1-bis(4-hydroxyphenyl)-3-methylcyclo-hexane, 1,1-bis-(4-hydroxyphenyl)-4-methylcyclohexane, 9,9-bis(3,5-dimethyl-4-hydroxyphenyl) fluorene.

2,2-Bis-(4-hydroxyphenyl)propane, 1,1-bis-(4-hydroxyphenyl)-3,3,5-trimethylcyclo-hexane and 1,1-bis-(4-hydroxyphenyl)-1-phenylethane are in particular preferred.

Both individual aromatic dihydroxy compounds and mixtures of aromatic dihydroxy compounds may be used to produce the oligocarbonates usable according to the invention.

Aromatic dihydroxy compounds, in particular those of the formula (III), are known from the literature or may be produced using processes known from the literature. (C.f., for example, U.S. Pat. No. 3,028,365 and the monograph by H. Schnell, Chemistry & Physics of Polycarbonates, Interscience Publishers, New York, 1964.)

Suitable diaryl carbonates (IV), in which Ar has the meaning stated for (II), are di-$C_6$–$C_{14}$-aryl carbonates, preferably the diesters of phenol, halo-substituted phenols or alkyl-substituted phenols, i.e., diphenyl carbonate or dicresyl carbonate.

The diaryl carbonates (IV) are known from the literature or may be produced using processes known from the literature.

Further details relating to the production of the aromatic oligocarbonates to be used according to the invention are familiar to the person skilled in the art. A diaryl carbonate excess of 1 to 30 mol. %, preferably of 2 to 15 mol. %, is accordingly used per mol of diphenol. It is also self-evident to the person skilled in the art that the aromatic dihydroxy compounds and diaryl carbonates must be used in the purest possible form, in particular they should have an alkali metal ion and alkaline earth metal ion content of less than 0.1 ppm, in order to avoid disruptive secondary reactions during production of the oligocarbonate.

Preferred catalysts for the production of the oligocarbonates to be used according to the invention are ammonium and phosphonium catalysts, such as for example tetramethylammonium hydroxide, tetramethylammonium acetate, tetramethylammonium fluoride, tetramethylammonium tetraphenylhydridoborate, tetraphenylphosphonium fluoride, tetraphenylphosphonium tetraphenylhydridoborate, tetraphenyl-phosphonium phenolate, dimethydiphenylammonium hydroxide, cetyltrimethylammonium tetraphenylhydridoborate and cetyltrimethyl-ammonium phenolate.

They are used in quantities of $10^{-8}$ mol to $10^{-4}$ mol, preferably of $10^{-7}$ mol to $10^{-5}$ mol, per mol of diphenol.

They may be used alone or as a mixture and added as the substance alone or as a solution, for example in water or phenol.

Catalysts suitable for the process according to the invention are those stated above for production of the oligocarbonate, which are either introduced into the reaction via oligocarbonates or additionally incorporated.

The catalysts may be used alone or as a mixture and added as the substance alone or as a solution, for example in water or phenol.

The process according to the invention may be performed continuously or batchwise, for example in stirred-tank reactors, film evaporators, in a series of stirred-tank reactors, extruders, kneaders, simple disk reactors and high viscosity disk reactors.

The polysiloxane/polycarbonate block co-condensation products obtainable using the process according to the invention have average molecular weights Mw of 18000 to 60000, preferably of 19000 to 40000, determined by measuring relative solution viscosity in dichloromethane or in mixtures of equal quantities by weight of phenol/o-dichlorobenzene calibrated by light scattering. This is achieved by polycondensing preferably low molecular weight oligocarbonates by monophenol distillation to yield relatively low viscosity polycarbonates and relatively high molecular weight oligocarbonates to yield relatively high viscosity polycarbonates.

Quantities of up to 6 wt. % of fillers and reinforcing materials may be added to the polysiloxane/polycarbonate block co-condensation products obtainable using the process according to the invention. Those stabilizers for example UV, heat and agents and flame retardants suitable for thermoplastic polycarbonates may also be added. Examples are alkyl phosphites, aryl phosphites, aryl phosphates, aryl phosphones, low molecular weight carboxylic acid esters, halogen compounds, chalk, silica flour, glass fibers and carbon fibers.

Other polymers, such as polyolefins, polyurethanes or polystyrenes, may be incorporated into the block co-condensation products obtainable according to the invention.

These substances, both those of a low molecular weight and those of a high molecular weight, are preferably added in conventional apparatus to the finished block co-condensation product.

The block co-condensation products obtainable using the process according to the invention may be processed into any desired moldings in the manner known for thermoplastic polycarbonates.

The polysiloxane/polycarbonate block co-condensation products obtainable using the process according to the invention may be used in any applications in which known aromatic polycarbonates have hitherto been used and where additionally good flow properties combined with improved mould release properties and elevated toughness at low temperatures and improved resistance to chemicals are required, such as for example for the production of large exterior motor vehicle components and switch boxes for external use, of sheets, cellular sheets, of parts for electrical and electronics applications and for optical storage media.

The invention is further illustrated but is not intended to be limited by the following examples in which all parts and percentages are by weight unless otherwise specified.

EXAMPLES

I) Production of Compounds of the Formula (I)

I/1) General Method

Size of batch:

10 mol of octamethylcyclotetrasiloxane ($D^4$-ring)

$$X = \frac{110 \, g/mol * 10 \, mol * 2}{z}$$

Y g of sulphuric acid

Y=(741.5+X)*0.1%

W g of perfluorobutanesulphonic acid

W=(741.5+X)*0.05%

V g of water $$V = \frac{9 \, g/mol * 10 \, mol * 2}{z}$$

U g of ammonium carbonate $$U = \frac{W + Y}{49 \, g/mol} * 96.1 \, g/mol$$

300 g of xylene or distillate from the preceding test
Method:

The octamethylcyclotetrasiloxane, hydroquinone, xylene and acids are introduced under nitrogen into a stirred vessel equipped with a heater, stirrer, thermometer, water separator, reflux condenser, heated up to reflux and stirred until the appropriate quantity of water has been separated. The temperature is then reduced to <60° C., the ammonium carbonate added and stirring continued for a further ½ an hour. A sample is taken, filtered and the acid content determined. If the acid content is >10 ppm of HCL, further ammonium carbonate is added and stirring continued for another ½ an hour.

Once the acid content is <10 ppm of HCl, the mixture is conditioned for 1 hour at 150° C. under an oil pump vacuum in a conditioning apparatus, cooled, vented with $N_2$ and filtered through a Seitz K 300 filter. Without distillate recirculation, yield is approx. 65% and with distillate recirculation approx. 75% of theoretical*.

*In industrial production, yields will be approx. 10 to 15% higher due to lower filtration losses.

The polydimethylsiloxanes listed in the table were obtained using this method.

TABLE 1

| Structure of the polydimethylsiloxanes having hydroquinone end groups | |
|---|---|
| EVH no. | Block length z |
| A | 42.6 |
| B | 28 |
| C | 10 |
| D | 35.5 |
| E | 24.8 |
| F | 29.6 |
| G | 27.1 |
| H | 17.9 |

II) Production of an Oligocarbonate of the Formula (II)

1139.8 g (4.992 mol) of bisphenol A, 1113.9 g (5.2 mol=104 mol. % relative to bisphenol A) of diphenyl carbonate and 0.328 g (0.01 mol. % relative to bisphenol A) of tetraphenyl-phosphonium tetraphenylhydridoborate are weighed out into a 5 liter steel vessel equipped with a stirrer, internal thermometer, short-path separator and 30 cm Vigreux column with a heated still head. Atmospheric oxygen is eliminated from the apparatus by applying a vacuum and purging with nitrogen (3 times) and the mixture is heated to 150° C. The liberated phenol is removed by distillation under a vacuum of 100 mbar and at approx. 180° C. The vacuum is then enhanced stepwise to 10 mbar over a period of approx. 1½ hours, the temperature raised to 250° C. and maintained for ½ an hour (holding phase I). An oligocarbonate is obtained which has a relative solution viscosity of ~1.123 and a phenolic OH content of 1900 ppm.

III) Comparative Example 1

1139.8 g (4.992 mol) of bisphenol A, 1113.9 g (5.2 mol=104 mol. % relative to bisphenol A) of diphenyl carbonate, 64.6 g (5 wt. % relative to bisphenol A) of polysiloxane D (see Table 1) and 0.328 g (0.01 mol. % relative to bisphenol A) of tetraphenylphosphonium tetraphenylhydridoborate are weighed out into a 5 liter steel vessel equipped with a stirrer, internal thermometer, short-path separator and 30 cm Vigreux column with a heated still head. Atmospheric oxygen is eliminated from the apparatus by applying a vacuum and purging with nitrogen (3 times) and the mixture is heated to 150° C. The liberated phenol is removed by distillation under a vacuum of 100 mbar and at approx. 180° C. The temperature is simultaneously raised in approx. 50 minutes to 180 to 190° C. and slowly increased to 250° C. over a further two hours. The vacuum is then enhanced stepwise to 1 mbar and the temperature raised to 280° C. The majority of the phenol has been eliminated at this time. After further heating at 280° C. and 0.1 mbar for 1½ hours, a light-colored, solvent-free polycarbonate is obtained. The relative solution viscosity is 1.331 (dichloromethane, 25° C., 5 g/l). The phenolic OH value of the block copolycarbonate is 100 ppm.

IV) Example 1

1139.8 g (4.992 mol) of bisphenol A, 1113.9 g (5.2 mol=104 mol. % relative to bisphenol A) of diphenyl carbonate and 0.328 g (0.01 mol. % relative to bisphenol A) of tetraphenyl-phosphonium tetraphenylhydridoborate are weighed out into a 5 liter steel vessel equipped with a stirrer, internal thermometer, short-path separator and 30 cm Vigreux column with a heated still head. Atmospheric oxygen is eliminated from the apparatus by applying a vacuum and purging with nitrogen (3 times) and the mixture is heated to 150° C. The liberated phenol is removed by distillation under a vacuum of 100 mbar and at approx. 180° C. The vacuum is then enhanced stepwise to 10 mbar over a period of approx. 1½ hours, the temperature raised to 250° C. and maintained for ½ an hour (holding phase I). An oligocarbonate is obtained which has a relative solution viscosity of ~1.123 and a phenolic OH content of 1900 ppm.

The apparatus is then vented with nitrogen, the vacuum adjusted to 100 mbar and 64.6 g (5 wt. % relative to bisphenol A) of polysiloxane A are simultaneously added and stirring continued for ½ an hour (holding phase II). The vacuum is enhanced to 10 mbar over 10 to 15 minutes, and to 1 mbar over a further 10 minutes and the temperature raised to 300° C. to 310° C. After ½ an hour the short-path separator is opened and polycondensation continued for a further 1½ hours.

A white copolycarbonate is obtained having a relative solution viscosity of 1.274 and a phenolic OH content of 120 ppm.

Example 2

As Example 1, but with a holding phase 1 of 2 hours.

Example 3

As Example 1, but with 3 wt. % relative to the weight of bisphenol A of A.

Example 4

As Example 1, but with 5 wt. % relative to the weight of bisphenol A of B.

Example 5

As Example 1, but with 5 wt. % relative to the weight of bisphenol A of C.

Example 6

As Example 1, but with 5 wt. % relative to the weight of bisphenol A of E and no holding phase I.

Example 7

As Example 1, but with 5 wt. % relative to the weight of bisphenol A of E and without holding phases I and II.

Example 8

As Example 1, but with 5 wt. % relative to the weight of bisphenol A of G.

Example 9

As Example 1, but with 5 wt. % relative to the weight of bisphenol a of H.

TABLE 2

Characteristic properties of the polycarbonates

| Example | | $\eta$rel | Phenolic OH(ppm) | Holding phase in min. | $\eta$rel (plt.)* | $\eta$rel spec.)** | Phenolic OH(ppm) |
|---|---|---|---|---|---|---|---|
| Comp. | 1 D | — | — | — | 1.311 | 1.302 | 100 |
| 1 | A | 1.123 | 1900 | 30 | 1.274 | 1.268 | 120 |
| 2 | A | 1.239 | 2300 | 120 | 1.246 | 1.241 | 700 |
| 3 | A | — | — | 30 | 1.282 | 1.264 | 140 |
| 4 | B | 1.118 | 2400 | 30 | 1.260 | 1.251 | 230 |
| 5 | C | 1.128 | 1800 | 30 | 1.276 | 1.250 | 70 |
| 6 | E | 1.128 | 2400 | 30 | 1.319 | 1.277 | 260 |
| 7 | E | 1.116 | 2200 | 0 | 1.279 | 1.259 | 100 |
| 8 | G | 1.142 | 1500 | 30 | 1.277 | 1.263 | 100 |
| 9 | H | — | — | 30 | 1.273 | 1.261 | 140 |

*plt. pellets
**spec. test specimen

Tensile Test: In order to investigate the mechanical properties of the SiCoPC specimens by tensile testing to DIN 53 455 (ISO 527), 10 no. 3 dumbbell bars (4 mm in thickness) of each polmer were produced by injection molding. Table 3 shows the results.

TABLE 3

Results of tensile testing to DIN 53 455

| No. | $\eta_{rel}$ (spec.) | Elonga-tion at break in % | Elonga-tion | Yield stress | Tear strength in N/mm² | Modulus of elasticity |
|---|---|---|---|---|---|---|
| Comp. 1 |  | 9 | 4.6 | 53 | 47 | 2100 |
| 1 | 1.260 | 93 | 5.8 | 57 | 49 | 2140 |
| 2 | 1.241 | 108 | 6 | 57 | 55 | 2330 |
| 3 | 1.264 | 101 | 6 | 60 | 57 | 2250 |
| 4 | 1.251 | 99 | 6 | 57 | 56 | 2300 |
| 5 | 1.250 | 90 | 5.8 | 57 | 90 | 2170 |
| 6 | 1.277 | 98 | 6 | 57 | 56 | 2100 |
| 7 | 1.259 | 99 | 6 | 57 | 56 | 2120 |
| 8 | 1.263 | 113 | 6 | 56 | 60 | 2070 |
| 9 | 1.261 | 110 | 5.9 | 57 | 59 | 2090 |

Low temperature impact strength: Izod notched flexural impact testing was performed on a notched specimen (ISO 180-4A) in order to determine the ductile-brittle failure transition point. ISO bars (63.5*12.7*3.2 mm) were produced by injection molding for this purpose. Table 4 shows the measurement results.

TABLE 4

Low temperature impact strength to ISO 180-4A
Notched impact strength (kJ/m²) to ISO 180-4A

| No. | Room temp. | −20° C. | −30° C. | −40° C. | −50° C. | −60° C. |
|---|---|---|---|---|---|---|
| Comp. 1 | 56d | 46d | 5d47/5b24 | 2d40/8b22 | — | — |
| 1 | 67d | — | — | 57d | 53d | 35b |
| 2 | 61d | 54d | — | 50d | 4d54/6b31 | 2d40/8b28 |
| 3 | 71d | 63d | 58d | 4d45/6b31 | 24b | — |
| 5 | 68d | — | — | 55d | 4d55/6b40 | 26b |
| 6 | 79d | 73d | — | 69d | 63d | 35b |
| 7 | 72d | 67d | — | 63d | 7d58/3b40 | 33b |
| 8 | 73b | 65d | — | 62d | 58d | 6d54/4b32 |
| 9 | 73d | 67d | — | 65d | 6d58/5b32 | 29b | b = brittle; d = ductile

The tabulated results specify the number of tests specimens which failed in a ductile fashion -d- and brittle fashion -b- and their respective average impact strength; therefore, the entry "5d47/5b24" means that 5 specimens failed in a ductile fashion and their average notched impact strength was 47 kJ/m², and that 5 specimens failed in a brittle fashion and that their notched impact strength was 24 kJ/m².

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of polysiloxane/polycarbonate block cocondensation products comprising reacting in the melt at temperatures of 250 to 320° C. and pressures of 0.01 to 100 mbar
   (a) a hydroxyaryloxy-terminated dimethylsiloxane with
   (b) an oligocarbonate having a weight average molecular weight of 3000 to 24000 and a molar ratio of its OH end groups to aryl end groups of 10:90 to 70:30, wherein the weight ratio of said (a) to said (b) is between 1:99 and 40:60.

2. The process of claim 1 wherein reaction is carried out in the presence of a catalyst.

3. The process of claim 1 wherein said weight ratio of said (a) to said (b) is 3:97 to 30:70.

4. The process of claim 1 wherein said molecular weight is 5000 to 15000.

5. The process of claim 1 wherein said molar ratio is 20:80 to 60:40.

6. A process for the production of polysiloxane/polycarbonate block cocondensation products comprising reacting in the melt at temperatures of 250 to 320° C. and pressures of 0.01 to 100 mbar (a) a hydroxyaryloxy-terminated dimethylsiloxane conforming to

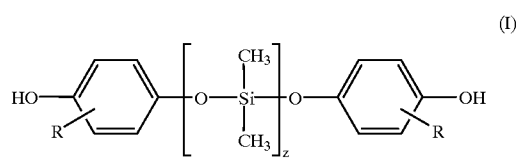

(I)

wherein

R is H, Cl, Br or a $C_1$–$C_4$ alkyl group, and z is 5 to 150, with (b) an oligocarbonate having a weight average molecular weight of 3000 to 24000 and a molar ratio of its OH end groups to aryl end groups of 10:90 to 70:30, conforming to

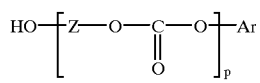 (II)
in which z is an arylene group having 6 to 30 C atoms, Ar is a $C_6$–$C_{14}$ aryl group, and p is 5 to 300, wherein the weight ratio of said (a) to said (b) is between 1:99 and 40:60.
7. Polysiloxane/polycarbonate block co-condensation products prepared by the process of claim 1.
8. An article of manufacture comprising the product of claim 7.
* * * * *